3,529,040
ACRYLONITRILE GRAFT COPOLYMERS
Heinrich Rinkler and Gunther Nischk, Dormagen, Germany, assignors to Farbenfabriken Bayer Aktiengesellschaft, Leverkusen, Germany, a corporation of Germany
No Drawing. Filed Apr. 15, 1968, Ser. No. 721,179
Claims priority, application Germany, Apr. 24, 1967,
F 52,225
Int. Cl. C08f 29/56
U.S. Cl. 260—898   5 Claims

ABSTRACT OF THE DISCLOSURE

This invention relates to acrylonitrile graft polymers comprised of acrylonitrile, optionally another olefinic unsaturated copolymerizable monomer and a mono-β-alkenyloxy-polyalkylene glycol-sulfoalkyl ether as graft substrate. Furthermore this invention relates to a process for the production of readily dyeable acrylonitrile graft polymers by graft polymerizing acrylonitrile-optionally together with another copolymerizable monomer—in the presence of a mono-β-alkenyloxy-polyalkylene—glycol sulfoalkyl ether and a radical forming catalyst. Graft polymerization may be effected in an aqueous medium or in an organic solvent for polyacrylonitrile.

---

The invention relates to acrylonitrile graft copolymers which have a good affinity for basic dyes, consisting of acrylonitrile, if desired of another copolymerisable monomer in polymerised form and of a mono-β-alkenyloxy-polyalkylene glycol-sulfoalkyl ether a graft substrate and to a process for their production.

Filaments and fibres produced from both acrylonitrile homopolymers and copolymers of acrylonitrile with neutral comonomers show insufficient affinity to dyes for practical purposes and therefore can only be dyed to a very limited extent with basic and acid dyes.

It is already known that monomers which contain allyl groups, e.g. allyl or methallylsulfonates, copolymerise only to a small extent with acrylonitrile and only a fraction of the molecules is incorporated in the polymer.

It is also known that acrylonitrile can be grafted on polyalkylene oxides, e.g. polyethylene oxide or polypropylene oxide, either alone or in combination with other monomers. Polymers with much better dyeability are produced by this method.

It is an object of this invention to provide an acrylonitrile graft polymer comprising at least 50% by weight of acrylonitrile and up to 40% by weight of another olefinic unsaturated copolymerisable monomer in polymerised form and .2 to 15% by weight of a graft substrate consisting of a mono-β-alkenyloxypolyalkylene glycol-sulfoalkyl ether of the formula

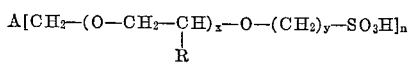

in which A denotes an aliphatic unsaturated radical, R is a hydrogen atom or a methyl group, x is an integer of 3 to 120, y is an integer of 2 to 6 and n is an integer of 1 to 5, said graft polymer having a molecular weight in the range of 300 to 5000 and a K-value (according to Fikentscher, Cellulosechemie 13, p. 58 (1932) in the range of 70 to 110.

A further object of the invention is a process for the production of acrylonitrile graft copolymers which have an acrylonitrile content of at least 50% and which can be dyed particularly well with basic dyes and which are particularly thermostable, whereby acrylonitrile, if desired together with other comonomers, is polymerised in an aqueous medium in an organic solvent or in a mixture of water and an organic solvent, with linear or branched mono-β-alkenyloxy-polyalkylene-glycol sulfoalkyl ethers, preferably having a molecular weight of 300 to 5000, in the presence of radical-forming catalysts. In this process, the degree of grafting of acrylonitrile, that is to say the quotient of graft polymer formed to the total amount of new polymer formed with mono-β-alkenyloxy-polyalkylene glycolsulfoallyl ethers is higher than that obtained with polyalkylene glycols or their alkylene ether sulfonic acids.

Mono-β-alkenyloxy-polyalkyleneglycol-sulfoalkylethers can be produced by reacting mono-β-alkenyloxy-polyalkylene glycols with aliphatic sulfones, the glycols being obtained by hydroxy alkylation of unsaturated aliphatic alcohols. The graft substrates used for the process have the general formula $$A[CH_2-(O-CH_2-CH)_x-O-(CH_2)_y-SO_3H]_n$$
$$\phantom{A[CH_2-(O-CH_2-}|$$
$$\phantom{A[CH_2-(O-CH_2-}R$$

in which A represents an aliphatic unsaturated organic radical, R is a hydrogen atom or an alkyl group, x is an integer of 3 to 120, y an integer of 2 to 6 and n is an integer of 1 to 5.

Examples of suitable graft substrates of this type, which preferably have a molecular weight of 300 to 5000, are given below:

$$CH_2=CH-CH_2-(O-CH_2-CH_2)_x-O-(CH_2)_3-SO_3H$$

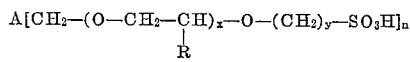

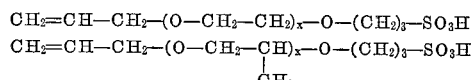

$$CH_3-CH=CH-CH_2-(O-CH_2-CH_2)_x-O-(CH_2)_3-SO_3H$$

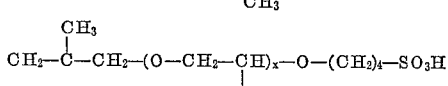

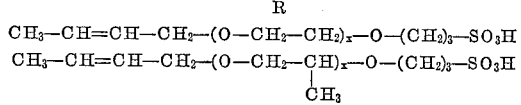

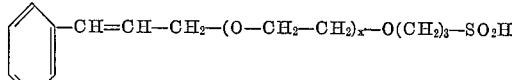

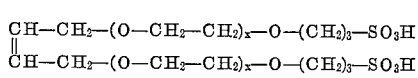

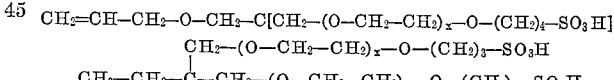

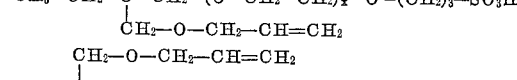

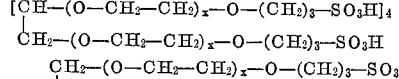

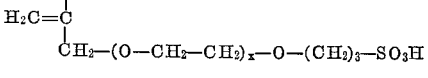

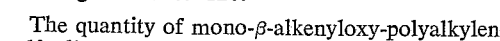

$x=$integer of 3 to 120.

The quantity of mono-β-alkenyloxy-polyalkylene glycol sulfoalkyl ether dissolved in the reaction medium depends both on the purpose for which the product obtained is to be used and on the method of polymerisation and the types of catalysts used for production of the grafted acrylonitrile. When acrylonitrile is polymerised in an aqueous medium, catalyst systems (e.g. persulfate/bisulfite) which produce end groups capable of binding cationic dyes are generally used.

If the graft copolymers are used in the production of fibres and filaments, the use of 2 to 15% by weight of the sulfonated mono-β-alkenyloxypolyalkylene oxides is sufficient to produce the dyeability generally required in practice. In order to achieve special effects, e.g. a particularly high increase in the hydrophilic property or swelling capacity of the graft polymers, up to 30% by weight of the graft substrate may be used.

If graft polymerisation of acrylonitrile is carried out in an organic solvent for example, dimethylformamide or dimethyl sulfoxide, 5 to 15% by weight of the mono-β-alkenyloxypolyarylene glycolsulfoalkyl ethers are required as graft substrate in order to achieve good dyeability because the catalysts preferably used for grafting acrylonitrile do not yield additional acid end groups as in the case of polymerisation in an aqueous medium.

The graft polymerisation of acrylonitrile on mono-β-alkenyloxy-polyarylene glycol-sulfoalkyl ether is preferably carried out in the presence of other copolymerisable unsaturated compounds. Examples of these compounds are, acrylic acid esters and methacrylic acid esters, vinyl esters such as vinyl acetate, styrene and neutral derivatives thereof, vinyl chloride, vinylidene chloride, vinyl bromides, acrylamides and methacrylamides, vinyl ketones and vinylidene cyanide. The solubility of the polymers can be substantially increased and the dyeability of the fibres further improved by inclusion of the third comonomer graft polymerisation by e.g. using methyl acrylate, methyl methacrylate or vinyl acetate. The polymer may contain 2 to 20% and preferably 5 to 7%, of the above mentioned comonomers. In order to reduce the inflammability and combustibility of the fibres as well as improving the dyeing properties, 20 to 40% by weight of vinylidene chloride may be used as an additional grafting component.

Aqueous polymerisation and grafting is preferably carried out using a water-soluble radical-forming catalysts or catalyst systems, for example inorganic or organic per compounds or azo compounds. Redox systems are preferred, especially those based on per compounds and sulfur compounds in lower stages of oxidation. The per compounds used in the redox system are preferably the water-soluble salts of peroxydisulfuric acid, e.g. potassium, sodium or ammonium persulfate. Examples of reducing components which may be used are sulfur dioxide, alkali metal hydrosulfites, alkali metal pyrosulfates and alkali metal thiosulfates.

The catalysts are used in quantities of 0.5 to 5% based on the total weight of the monomers. The ratio of oxidizing to reducing agent in the redox system is preferably from 1:2 to 1:10. Polymerisation of the unsaturated compounds is then carried out by known continuous or intermittent processes. About 5 to 10 times the quantity of reactant put into the process of deionised water are used. The reaction temperature depends on the type of catalyst and the monomers used. It may be between 20 and 90° C. Polymerisation and grafting are preferably carried out between 40 and 65° C.

The mono - β - alkenyl-polyalkylene glycol-sulfoalkyl ethers are generally dissolved in the aqueous medium and heated to the polymerisation temperature. The monomer or mixture of several monomers to be grafted are added together with the catalyst at a pH of between 1 and 6, preferably between 1 and 4, either all at once or gradually. Alternatively the catalyst or catalyst mixture are added after addition of the monomers. The graft copolymers obtained are separated from the liquid phase by filtration or centrifugation, are washed with deionised water and are dried under reduced pressure or in a current of hot air.

When graft polymerisation is carried out in organic solvents such as dimethylformamide, the solvent may contain up to 25% by weight of mono-β-alkenyloxy-polyalkylene glycolsulfoalkyl ether and acrylonitrile which is to be grafted. If the grafting of acrylonitrile is carried out in the presence of other comomers, e.g. with 5 to 8% by weight of methyl acrylate, the proportion of graft substrate and momers may be increased to 50% by weight, preferably 25 to 35% by weight of the dimethylformamide without gelling or cloudiness of the solution occurring during or after completion of the graft polymerisation. Owing to the poor solubility properties, the concentration of grafting components in other solvents such as dimethylacetamide, dimethylsulfoxide or ethylene carbonate is about 5 to 10% by weight less than in dimethyl formamide.

Radical forming catalyst systems which are soluble in the solvents used may be employed to initiate polymerisation and grafting. Examples of these catalysts are azo compounds such as azo isobutyronitrile, inorganic peroxides such as ammonium persulfate, organic hydroperoxides, keto peroxides, acyl peroxides or peresters. Redox systems which are effective also at lower temperatures are preferably employed. These may consist of the above mentioned organic peroxides together with reducing compounds such as sulfinic acid derivatives. Effective reducing components which are derivatives, sulfinic acid are alkali metal or aminosulfones or sulfinic acids, sulfinic acid esters and amides, and α-aminosulfones or formamidine sulfinic acid. In these redox systems, the presence of a strong acid such as sulfuric acid or aromatic sulfonic acid is advisable, and, in some cases, is necessary. The reaction mixture generally contains up to 3% of the above mentioned catalysts. In the case of redox systems, the molar ratio between peroxide and sulfinic acid derivative is between 1:0.2 and 1:4. The acid may be used in and up to 4 times molar excess of the sulfinic acid derivative.

The acrylonitrile and other comonomers may also be grafted on the mono-β-alkenyloxy-polyalkylene glycol-sulfoalkylether in a mixture of organic solvents and water. The polymerisation temperature may be chosen within a wide range of between 0 and 100° C., depending on the catalysts and solvent used. The graft polymerisation is preferably carried out between 25 and 65° C. When the desired extent of grafting or solution concentration has been achieved, graft polymerisation is stopped by the addition of a known inhibitor. The solution may then be spun by known dry or wet spinning processes either immediately or after removal of un-reacted monomers, e.g. in a thin layer evaporator under reduced pressure. The spinning solutions thus obtained are colourless or only slightly discoloured, clear and free from gel, so that working them up presents no problem. The graft polymer can also be obtained in solid form by pouring the viscous polymer solution into water or a water/methanol mixture with vigorous stirring (e.g. with an Ultraturrax).

The sulfonic acid groups in the graft copolymers produced by the process impart exceptionally good dyeability with basic dyes to the polymers. The graft copolymers obtained by the process according to the invention in addition are substantially more hydrophilic than pure polyacrylonitrile or copolymers of acrylonitrile. Solutions of the graft polymers, e.g. in dimethylformamide or dimethylsulfoxide, are thermostable, are clear and free from gelling and can be spun without difficulty.

The preparation of allyl oxy-polyethylene glycol-sulfopropyl-ether is described below by way of example:

Ethylene oxide is introduced into a mixture of 58 parts of allyl alcohol and 1 part of potassium hydroxide at 95° C. Hydroxyethylation of the allyl alcohol occurs, and the temperature is allowed to rise slowly to 130° C. when the desired molecular weight has been reached, hydroxyethylation is stopped, 122 parts of propane sultone-1, 3 are added and the reaction mixture is heated at 60 to 100° C. for 15 to 24 hours in the course of which time allyl oxy-polyethylene glycol-sulfopropyl ether is formed.

EXAMPLE 1

30 parts of allyloxy-polyethylene glycol-sulfopropyl ether $CH_2=CH-CH_2-(O-CH_2-CH_2)x$
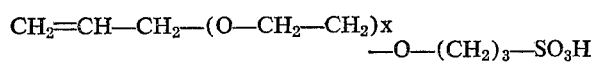

$x=13$ to 14 (molecular weight about 800) are dissolved with rapid stirring in 4000 parts of deionised water. 285 parts of acrylonitrile and 15 parts of methyl acrylate are then introduced into the solution. Graft polymerisation is initiated at 50 to 55° C. by the addition of 2.1 parts of potassium persulfate and 6.3 parts of sodium metabisulfite. Polymerisation is carried out under a nitrogen atmosphere for 4 to 5 hours at 55 to 60° C. The graft polymer obtained is filtered off, thoroughly washed with deionised water and is dried in a vacuum drying cupboard at 50° C. Yield 281 parts (85%). K-value (according to Fikentscher, Cellulosechemie 13, p. 58, 1932): 82.

EXAMPLE 2

131.6 parts of acrylonitrile, 8.4 parts of methyl acrylate and 14 parts of allyloxy-polyethylene glycol-sulfopropyl ether (molecular weight about 800) are dissolved in a mixture of 252.2 parts of dimethylformamide and 7.8 parts of water with stirring at 35 to 40° C. 1 part of concentrated sulfuric acid is added and polymerisation is initiated with 1.2 parts of toulene sulfinamide and 2 parts of monotertiary butyl maleate (50% paste in dimethylphthalate). After carrying out polymerisation for 16 hours at 35 to 40° C., the pale, highly viscous solution is diluted with the same volume of dimethylformamide and the graft copolymer is precipitated with water and broken up in an Ultraturrax. After it has been thoroughly washed with deionised water, the graft copolymer is dried in a vacuum drying cupboard at 50° C. Yield: 136 parts (88%). K-value: 85.

EXAMPLE 3

7.5 parts of butene-2-dioxy-1,4-bis-polyethyleneglycolsulfopropylether

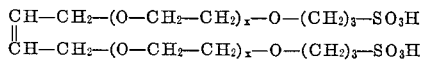

(molecular weight 1570) are dissolved with stirring in 2000 parts of deionised water. 142.5 parts of acrylonitrile and 7.5 parts of methyl acrylate are introduced into the solution. The temperature of the reaction mixture is raised to 50° C. and graft polymerisation is initiated by the addition of 1 part of potassium persulfate and 4 parts of sodium metabisulfite. Polymerisation is carried out for 4 to 5 hours at 55 to 60° C. (nitrogen atmosphere). The graft copolymer obtained is filtered off, washed with water until free from salt, and dried in a vacuum drying cupboard at 50°C. Yield 137 parts (87%) K-value 86.

The sulfonic acid groups incorporated in the polymer by the grafting reaction were determined by potentiometric titration in dimethylformamide solution as follows:

1 g. of polymer in 100 ml. of dimethylformamide was treated with a mixed bed ionic exchanger and then with a strongly acid ionic exchanger and then titrated with N/100 methanolic potassium hydroxide. The measuring instrument used was a pH meter made by Firma Knick, Type 52 (Calomel glass electrode).

The measured values are entered in the following table as milliequivalents of acid groups per 1000 g. of polymer. In addition, the increased dyeability of the graft copolymers could be demonstrated by dyeing the films produced from them with basic dyes. The films are produced from a 15% dimethylformamide solution in a layer about 50µ, in thickness washed free from solvent and dyes with Astrazon Blue B (Colour Index, 2nd edition, vol. III, No. 42140) in a dyeing bath of the following composition:

|   | Ml. |
|---|---|
| Astrazon Blue B solution (1 g./l.) | 100.0 |
| Acetic acid (30 g./l.) | 2.0 |
| Sodium acetate (40 g./l.) | 0.3 | for one hour at boiling point. The amount of dye taken up is determined quantitatively by dissolving the dyed films in dimethylformamide which contains 1 g. of sulfuric acid per litre. The number of grams of dye taken up per gram of film are determined by means of a photometer and a calibration curve (wavelength 620 m$\mu$). An acrylonitrile homopolymer (K-value 86) was used for comparison. To test the dyeing tendency of the graft copolymers, 5% solutions in dimethylformamide were prepared and tempered at 80° C. in the presence of air. The extinction values of the solutions were determined after 20 hours by means of an electrophotometer (Type BFK photometer DS1 of Firma Kipp and Zonen) at a wavelength of 470 m$\mu$ (length of photometer tube 1 cm., standard solution pure dimethylformamide).

| Graft copolymer Example No. | milliequivalents acid groups 1,000 g. Pm | G. dye/ g. film | Tempering value extinction 470 m$\mu$ |
|---|---|---|---|
| 1 | 118.3 | $2.82 \cdot 10^{8_2}$ | 0.069 |
| 2 | 97.0 | $2.20 \cdot 10^{8_2}$ | 0.061 |
| 3 | 71.5 | $1.64 \cdot 10^{8_2}$ | 0.071 |
| Standard | 23.0 | $0.25 \cdot 10^{8_2}$ | 0.072 |

What we claim is:

1. An acrylonitrile graft polymer comprising at least 50% by weight of acrylonitrile and up to 40% by weight of another olefinic unsaturated copolymerisable monomer in polymerised form and 2 to 15% by weight of a graft substrate consisting of a mono-$\beta$-alkenyloxypolyalkylene glycol-sulfoalkyl ether of the formula

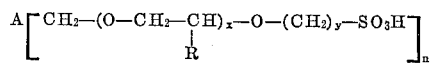

in which A denotes an aliphatic unsaturated radical, R is a hydrogen atom or a methyl group, $x$ is an integer of 3 to 120, $y$ is a integer of 2 to 6 and $n$ is an integer of 1 to 5, said graft polymer having a molecular weight in the range of 300 to 5000 and a K-value (according to Fikentscher, Cellulosechemie 13, p. 58 (1932)), in the range of 70 to 110.

2. The acrylonitrile graft polymer of claim 1, wherein said copolymerisable olefinic unsaturated monomer is methyl acrylate.

3. A process for the production of readily dyeable acrylonitrile copolymers which comprises graft polymerising at least 50% by weight acrylonitrile and up to 40% by weight of another copolymerisable olefinic unsaturated monomer, onto 2 to 15% by weight of a graft substrate consisting of a mono-$\beta$-alkenyloxypolyalkylene glycol-sulfo-alkyl ether in the presence of radical forming catalysts.

4. The process according to claim 1, wherein said graft polymerising being effected in an aqueous medium at pH 1 to 6 in the presence of a redox catalyst system comprising a persulfate and a sulfur compound in lower stages of oxidation.

5. The process according to claim 1, wherein said graft polymerising being effected in dimethyl formamide solution in the presence of a radical forming catalyst being soluble in the reaction medium.

References Cited

UNITED STATES PATENTS 3,384,682  5/1968  Erchak _____ 260—874
3,341,627  9/1967  Wilkinson _____ 260—898

SAMUEL H. BLECH, Primary Examiner

C. J. SECCURO, Assistant Examiner

U.S. Cl. X.R.

8—162, 177; 260—79.3, 607, 874, 881, 899, 901